2,864,853

PROCESS FOR THE PRODUCTION OF HALOALKANE NITRATES

Gustave Bryant Bachman and Ted J. Logan, West Lafayette, Ind., assignors to Purdue Research Foundation No Drawing. Application August 7, 1956
Serial No. 602,513

5 Claims. (Cl. 260—467)

Our invention relates to the production of haloalkyl nitrates and more particularly it relates to the liquid phase halonitroxylation of alkenes to produce bromo and iodoalkly nitrates.

We have discovered a process for the production of bromoalkyl nitrates and iodoalkyl nitrates whereby we can employ readily available alkenes to produce corresponding haloalkyl nitrates. The alkenes which we employ are those alkenes containing up to about twenty carbon atoms.

Our process consists essentially of adding an alkene to a solution of liquid dinitrogen tetroxide and bromine or iodine. The reaction may be carried out utilizing the liquid dinitrogen tetroxide as a solvent for the halogen, or a neutral solvent, such as a liquid saturated hydrocarbon, for example octane, a nitroparaffin, for example 2-nitropropane, or a polychlorinated hydrocarbon, for example chlororom, can be employed as a solvent for both the liquid dinitrogen tetroxide and the halogen with advantageous results. When the solution will no longer absorb the alkene, the products are water extracted, dried, and fractionally distilled at reduced pressures to remove any other products formed in the reaction.

We have found that the conversion to haloalkyl nitrates, based on dinitrogen tetroxide, increases as the ratio of amount of halogen to dinitrogen tetroxide increases until a conversion of 36% is obtained at mole ratios of four and above. We have also found that there is a rapid increase in the amount of dihaloalkane formed as the ratio of halogen to dinitrogen tetroxide increases.

In carrying out our process for the halo-nitroxylation of alkenes, we employ a temperature range from $-10°$ C. to $+20°$ C. and a mole ratio of halogen to dinitrogen tetroxide of 0.2 to 4.0. We prefer to use temperatures of about 0° C. and to use a solution containing a mole ratio of halogen to dinitrogen tetroxide of 1.0 or less since, as indicated above, larger ratios appreciably increase the amount of alkene dihalides formed in the reaction.

We have found that the compounds of our new process are useful as hydrocarbon-soluble nitrating agents and as additives for diesel fuels.

A better understanding of the nature of our invention can be had by reference to the following examples which are illustrative of our invention. We do not intend to be limited to the procedures, amounts and conditions set out in the examples but rather we intend for all equivalents and variations obvious to those skilled in the art to be included within the scope of this specification and the attached claims.

EXAMPLE I

Into a Pyrex reaction vessel, submerged in an ice water bath, containing an internal cooling coil, a thermometer, a gas bubbling tube, and an exhaust vent which was connected to a wash bottle containing a solution of bromine in chloroform, one mole of bromine was introduced and cooled to 0° C. Liquid dinitrogen tetroxide, 0.5 mole, was then introduced into the vessel at 0° C. Propylene was then slowly bubbled into the vessel while the reacting mixture was maintained at about 0° C.

After about 45 minutes, excessive bubbling and loss of color in the wash bottle indicated that the reaction was complete. The solution was then allowed to warm to room temperature, extracted with four 25-ml, portions of water and dried over calcium sulfate. Distillation yielded 1,2-dibromopropane, 157.0 grams, B. P. 77° C. (99 mm.), $n_D^{20}$ 1.5182 and 1-bromo-2-propyl nitrate, 27.4 grams, B. P. 180° C. (97 mm.); $n_D^{20}$ 1.4695, $$d_{20}^{20} 1.637$$

The theoretically calculated composition was: C, 19.55; H, 3.26; N, 7.60; Br, 43.50. The composition as determined by experiment was: C, 19.55; H, 3.43; N, 7.60; Br, 43.55.

EXAMPLE II

Using the apparatus of Experiment I, 0.2 mole of iodine was dissolved in 200 mls of chloroform and to this solution 0.2 mole of dinitrogen tetroxide was added. Ethylene was bubbled through this mixture until the bromine in the wash bottle was decolorized. The supernatant liquid was poured off from the 23.9 g. of solid iodine which remained unreacted. The liquid was washed with 2 N sodium thiosulfate until the iodine color was removed. The sodium thiosulfate removed an additional 2.1 g. of unreacted iodine. The chloroform was removed leaving 31.7 g. of a clear liquid that gave a positive nitric ester test. Fractional distillation of this liquid gave 19.5 gms. of a liquid, B. P. 33° C. (0.5 mm.), $n_D^{20}$ 1.5375, $$d_{20}^{20} 2.113$$

that became slightly violet on standing. The theoretical composition of this 2-iodoethyl nitrate was as follows: C, 11.10; H, 1.84; N, 6.45; I, 58.50. The experimentally determined composition was as follows: C, 11.42; H, 2.06; N, 6.55; I, 58.22.

EXAMPLE III

Using the apparatus and procedure of Example I, except for the addition of 200 mls of 2-nitropropane as a solvent for the reactants and the use of ethylene as a reaction yielded 119.0 grams of ethylene bromide and 41.0 grams of 2-bromoethyl nitrate.

EXAMPLE IV

Using the apparatus and procedure of Example I except for the addition of 200 mls. of cyclohexane as a solvent for the reactants and the use of ethylene as a reactant, the reaction yielded 122.4 grams of ethylene bromide and 37.9 grams of 2-bromoethyl nitrate.

EXAMPLE V

Other haloalkyl nitrates were prepared by the procedure of Example 1, using various alkenes. The following compounds were prepared using the alkene cited:

Table I
HALOALKYL NITRATES

| Alkene | Product | Mole Ratio of $Br_2$ to $Br_2$ to $N_2O_4$ | B. P., °C.(mm.) | $d^{20}_{20}$ | $n^{20}_D$ | Analyses | |
|---|---|---|---|---|---|---|---|
| | | | | | | Calcd. | Found |
| 1-Butene | 1-bromo-2-butyl nitrate | 0.744 | 83.5 (18) | 1.539 | 1.4697 | C, 24.20<br>H, 4.04<br>N, 7.07<br>Br, 40.40 | 24.30<br>3.97<br>7.27<br>40.21 |
| 2-Butene | 3-bromo-2-butyl nitrate | 0.744 | 93.5 (34) | 1.531 | 1.4692 | C, 24.20<br>H, 4.04<br>N, 7.07<br>Br, 40.40 | 24.43<br>4.15<br>7.13<br>40.22 |
| 2-methylpropene | 1-bromo-2-methyl-2-propyl nitrate | 0.744 | 79.5 (18) | 1.547 | 1.4690 | C, 24.20<br>H, 4.04<br>N, 7.07<br>Br, 40.40 | 24.46<br>4.10<br>7.13<br>39.85 |

Now having described our invention, what we claim is:

1. A process for the production of haloalkyl nitrates which comprises passing an alkene containing up to about 20 carbon atoms into a mixture of liquid dinitrogen tetroxide containing a halogen selected from the group consisting of bromine and iodine.

2. A process for the production of haloalkyl nitrates which comprises passing an alkene containing up to about 20 carbon atoms into an inert liquid solvent containing dinitrogen tetroxide and a halogen selected from the group consisting of iodine and bromine.

3. A process for the production of haloalkyl nitrates which comprises passing an alkene containing up to about 20 carbon atoms into an inert liquid solvent containing as reactive solutes the two compounds dinitrogen tetroxide and a halogen selected from the group consisting of bromine and iodine, the temperature of said solvent being maintained at from $-10°$ C. to $+20°$ C.

4. A process for the production of haloalkyl nitrates which comprises passing an alkene containing up to about 20 carbon atoms into a solution containing as reactive solutes dinitrogen tetroxide and a halogen selected from the group consisting of bromine and iodine, the halogen to dinitrogen mole ratio ranging from 0.2 to 4.0 and the temperature of the solution being maintained at from $-10°$ C. to $+20°$ C.

5. A process for the production of haloalkyl nitrates which comprises passing an alkene containing up to about 20 carbon atoms into an inert solvent solution containing as reactive solutes dinitrogen tetroxide and a halogen selected from the group consisting of bromine and iodine, the mole ratio of bromine to dinitrogen tetroxide being up to 1.0 and the temperature of the solution being maintained at about $0°$ C.

References Cited in the file of this patent

OTHER REFERENCES

Birckenbach et al.: "Chem. Abstracts," vol. 29 (1935), pages 125–126.

Weghofer: "Chem. Abstracts," vol. 48 (1954), pages 11295 to 11296.

UNITED STATES PATENT OFFICE

CERTIFICATE OF CORRECTION

Patent No. 2,864,853  December 16, 1958

Gustave Bryant Bachman et al.

It is hereby certified that error appears in the printed specification of the above numbered patent requiring correction and that the said Letters Patent should read as corrected below.

Column 2, line 21, for "180° C." read -- 108° C. --; lines 54 and 55, for "as a reaction yielded" read -- as a reactant, the reaction yielded --; column 3, Table I, heading to the third column, for "Mole Ratio of $Br_2$ to $Br_2$ to $N_2O_4$ read -- Mole Ratio of $Br_2$ to $N_2O_4$ --.

Signed and sealed this 14th day of April 1959.

(SEAL)
Attest:

KARL H. AXLINE
Attesting Officer

ROBERT C. WATSON
Commissioner of Patents